United States Patent [19]

Schmid et al.

[11] Patent Number: 5,065,134

[45] Date of Patent: Nov. 12, 1991

[54] TIRE PRESSURE SENSOR FOR MOTOR VEHICLES

[75] Inventors: Hans-Dieter Schmid, Nürnberg; Gerhard Hettich, Dietenhofen; Johannes Burkard, Nürnberg; Wolfgang Schmierer, Pforzheim, all of Fed. Rep. of Germany

[73] Assignees: Robert Bosch GmbH; Dr. Ing. H.C.F. Porsche AG, both of Stuttgart, Fed. Rep. of Germany; a part interest

[21] Appl. No.: 477,953

[22] PCT Filed: Oct. 16, 1988

[86] PCT No.: PCT/DE88/00634

§ 371 Date: Jun. 4, 1990

§ 102(e) Date: Jun. 4, 1990

[87] PCT Pub. No.: WO89/05239

PCT Pub. Date: Jun. 15, 1989

[30] Foreign Application Priority Data

Dec. 4, 1987 [DE] Fed. Rep. of Germany ....... 3741129

[51] Int. Cl.[5] .............................................. B60C 23/00
[52] U.S. Cl. .................................. 340/442; 340/448; 200/61.22; 200/61.25
[58] Field of Search ............... 340/442, 445, 626, 448; 200/61.22, 61.25

[56] References Cited

U.S. PATENT DOCUMENTS 4,435,625 3/1984 Buchschmid et al. ........... 200/61.22
4,793,277 12/1988 Haas et al. ................. 200/61.25 X

FOREIGN PATENT DOCUMENTS 2626475 12/1976 Fed. Rep. of Germany .
3243854 5/1984 Fed. Rep. of Germany .

Primary Examiner—Donnie L. Crosland
Assistant Examiner—Jeffery A. Hofsass
Attorney, Agent, or Firm—Michael J. Striker

[57] ABSTRACT

The tire pressure sensor (13) for monitoring vehicle tires is fastened radically relative to the wheel axis at the circumference of a wheel rim and includes a reference pressure chamber (20) with a contact pin (22) which cooperates with an electrically conductive diaphragm (21) closing the reference pressure chamber (20) toward the tire. An added mass (30) is fastened freely at the diaphragm center for raising the switching threshold of the tire pressure sensor (13) as a function of speed and is dimensioned in such a way that the switching threshold is raised by a desired pressure differential ($\Delta p$) relative to the switching threshold $p_o$ at standstill at a predetermined radius r of the diaphragm (21), a predetermined rotational radius R of the diaphragm (21) and a predetermined rotational speed v of the diaphragm (21). The required added mass (m) results from the equation $m = f(\Delta p, r^2, R, v^2)$, advantageously $m = (\pi/4)r^2\{[R/v^2]\Delta p - p.a\}k$ wherein p is the material density of the diaphragm, a is the diaphragm thickness and the factor k is between 1.1 and 1.5.

6 Claims, 2 Drawing Sheets

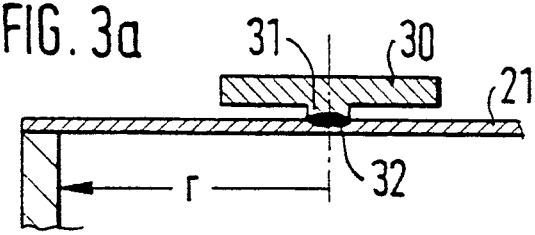
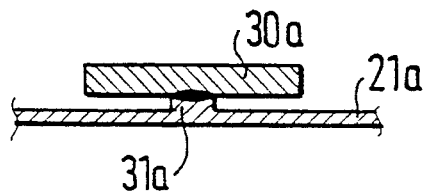
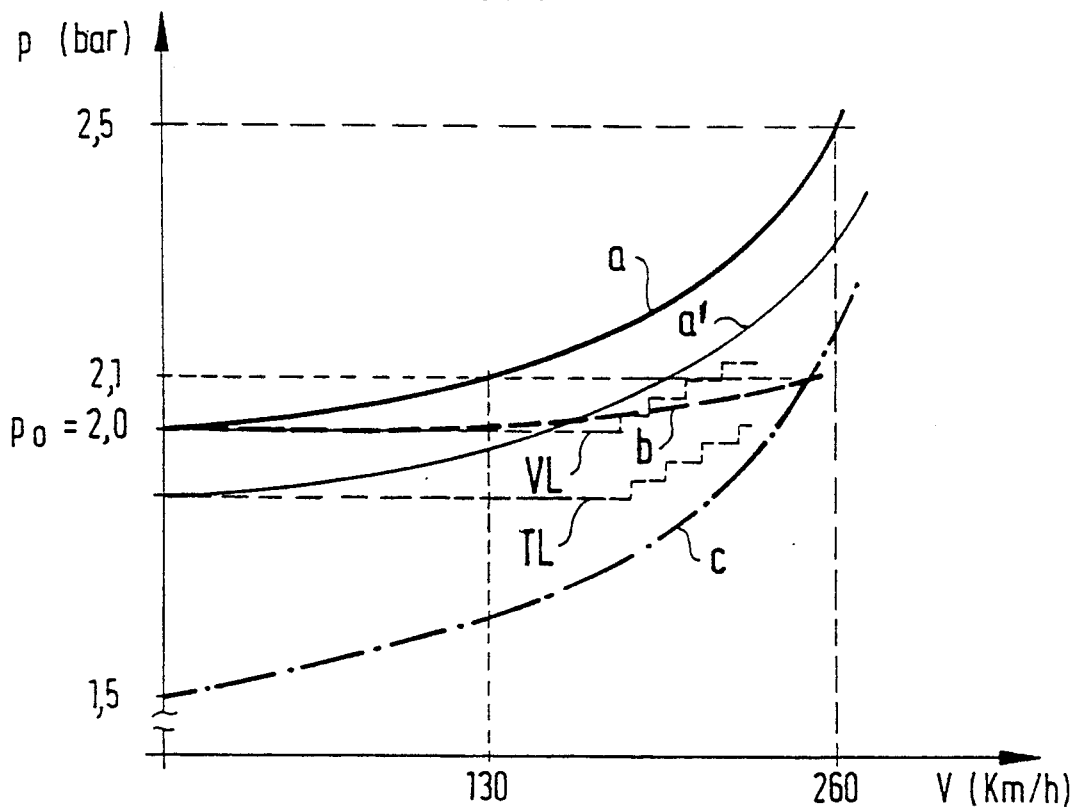

TIRE PRESSURE SENSOR FOR MOTOR VEHICLES

BACKGROUND OF THE INVENTION

The invention relates to a tire pressure sensor for motor vehicles.

The known tire pressure sensor for a vehicle includes a pressure switch which is fastened to the circumference of the wheel rim of a vehicle wheel. The pressure switch extends radially relative to the wheel axis and is actuated by the tire pressure. It is closed toward the tire by an electrically conductive diaphragm, which is oriented parallel to the running surface of the tire and is provided with an added mass for raising the switching threshold of the tire pressure sensor as a function of speed. This diaphragm is provided with a contact which is contacted by a contact surface at the central area of the diaphragm for closing an electrical circuit, when there is sufficient air pressure in the tire. The state of the electric circuit is to be monitored without the use of wires by a receiver in the vehicle, which is an evaluating circuit.

For high vehicle speeds of more than 160 km/h, tire and vehicle manufacturers prescribe increased tire pressures in order to ensure driving safety. In order to take this into account, the switching threshold of the pressure chamber must be adjusted to the highest required pressure. This leads to a loss of comfort at low speeds (DE-OS 32 43 845). If this is not taken into account and the tire pressure sensor is adjusted instead to the tire pressure prescribed in the lower speed range at full load, the required higher tire pressure is not monitored at high speeds, rather a nonexistent security is erroneously assumed because of the tire pressure monitoring device.

It is known from DE-OS 26 26 475 to provide the diaphragm of the reference pressure chamber of a tire pressure sensor with a solid piston whose front side is contacted by the inner tube of the tire to be monitored and which presses in the diaphragm against the pressure in the reference pressure chamber when there is sufficient air pressure in the tire until an electrical contact is made in the reference pressure chamber. It is also mentioned in this text that centrifugal forces at the piston of the diaphragm advantageously reduce the force exerted on the diaphragm by the tire pressure as the speed increases, so that the tire pressure must be increased at higher speeds into order to keep the switching contact closed. However, it is disadvantageous that this piston used as added mass for the diaphragm is covered by the inner tube of the tire, so that centrifugal forces acting on it are only partially effective, and in a completely indeterminate manner, at the reference pressure chamber for raising the switching threshold. Therefore, it is not possible with this solution to implement the increase in the switching threshold by a reproducible degree at a determined speed relative to standstill, since the speed-dependent raising of the switching threshold can not be determined beforehand in this known construction.

SUMMARY OF THE INVENTION

It is an object of the present invention to provide a tire pressure sensor in which the added mass at the diaphragm of the reference pressure chamber is arranged and dimensioned in such a way that the switching threshold is raised in the upper speed range by a predetermined, reproducible amount relative to standstill.

According to the present invention, the added mass fastened at the diaphragm center is free and is dimensioned by the equation $m = f(\Delta p, r^2, R, v^2)$ so as to be large enough that it raises the switching threshold by a desired pressure differential p compared with the threshold value $p_0$ at standstill at a predetermined radius r of the diaphragm, a predetermined rotational radius R of the diaphragm, and a predetermined rotational speed v of the diaphragm.

The tire pressure sensor, according to the invention, has the advantage that the tire pressure sensor also raises the threshold value for the minimum pressure in the tire by an amount required for the safety of the tire as a function of the speed at high speeds of the vehicle. It is accordingly ensured that a signal is always triggered by the tire pressure monitoring device when the vehicle exceeds the maximum allowable speed for the present tire pressure. A further advantage consists in that the added mass of the diaphragm raises the switching threshold progressively as the speed increases by means of the almost punctiform fastening at the center of the diaphragm, so that the characteristic line of the threshold value of the tire pressure sensor, which increases as a function of the speed, has a flat curve in the lower speed range and rises progressively faster in the upper speed range. Accordingly, it is possible to keep the threshold value above the pressure value at which the tire would be destroyed at full load over the entire speed range. Moreover, a stiffening of the diaphragm is prevented to a great extent by fastening the added mass to the diaphragm in a manner which is as punctiform as possible. The sensitivity of the diaphragm is maintained and the added mass can be accurately calculated independently of this by means of the desired speed-dependent raising of the switching threshold. In order to determine the added mass at the diaphragm accurately, this added mass is advisably determined according to the equation $$m = \frac{\pi}{4} \cdot r^2 \cdot \left( \frac{R}{v^2} \cdot \Delta p - \rho \cdot a \right) \cdot k,$$

wherein the diaphragm has radius r, rotational radius R and rotational speed v, the switching threshold is raised by the pressure differential p and wherein the stiffening of the diaphragm is accounted for by the fastening of the added mass by the factor k, which can be determined for every overall size of the tire pressure sensor by means of measurement and is between 1.1 and 1.5. A particularly advantageous factor k can be achieved in that the added mass is fastened at a central projection of the diaphragm and/or the added mass is fastened at the diaphragm with a spot weld. On the other hand, an annular weld, which withstands greater stress, can also be used at the center of the diaphragm.

BRIEF DESCRIPTION OF THE DRAWING

An embodiment example of the invention is shown in the drawing and explained in detail in the following description.

FIG. 3a shows a greatly enlarged area of the diaphragm with the added mass in a first embodiment form; and FIG. 3b shows the same diaphragm area in another embodiment form;

FIG. 4 shows different speed-dependent characteristic lines of a tire pressure monitoring.

DESCRIPTION OF THE EMBODIMENT EXAMPLE

Figure 1:
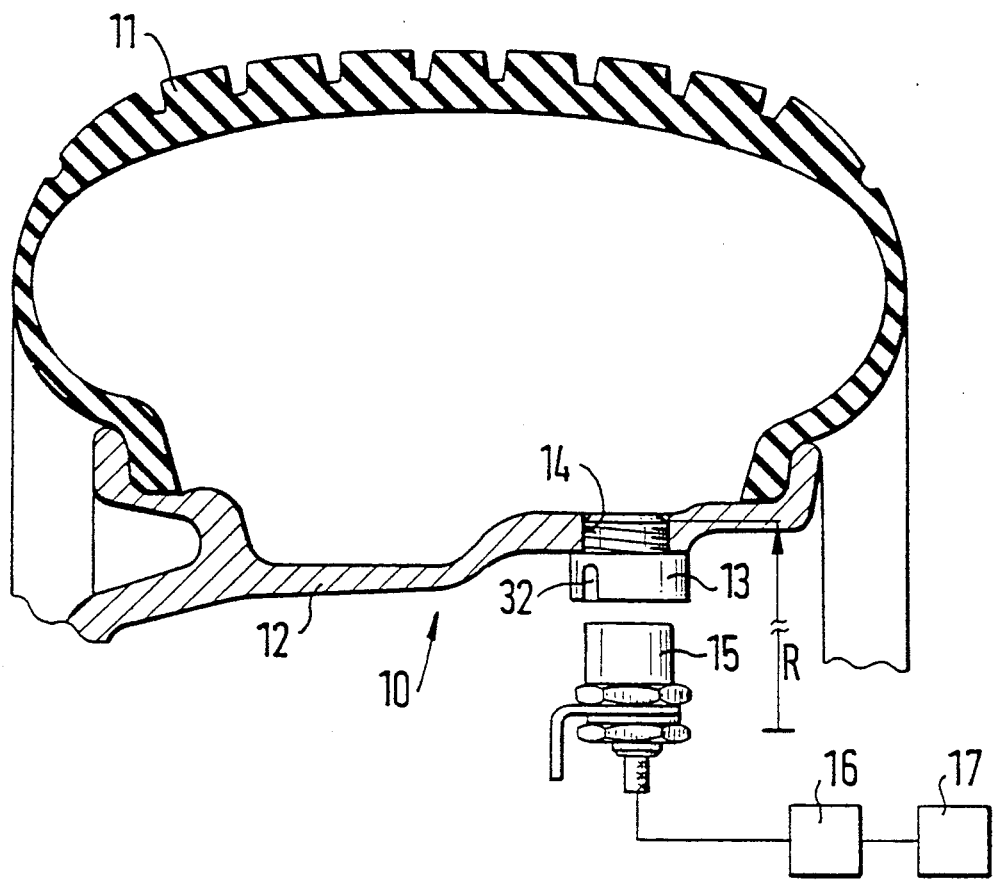
FIG. 1 shows the section of a vehicle wheel with a tire pressure sensor, according to the invention, inserted in the rim.

In FIG. 1 the section of a motor vehicle wheel is shown in reduced scale in cross section and is designated by 10. It shows a tire 11 which is fastened on a wheel rim 12. A tire pressure sensor 13 is fastened at an inwardly directed portion of the wheel rim 12 radially relative to the wheel axis in a threaded bore hole 14 of the wheel rim 12. At a slight distance from the latter, a signal generator 15, whose front side is directed toward the tire pressure sensor 13, is fastened in the area of the tire pressure sensor 13 at the wheel suspension of the vehicle, not shown, and couples a high-frequency oscillation into the tire pressure sensor 13 as the latter passes by during every revolution of the vehicle wheel 10. The generator 15, together with the receivers of the rest of the vehicle wheels, is connected to an evaluating circuit 16 with a connected warning indicator 17 which gives off an alarm signal when the air pressure is too low in one of the tires.

Figure 2:
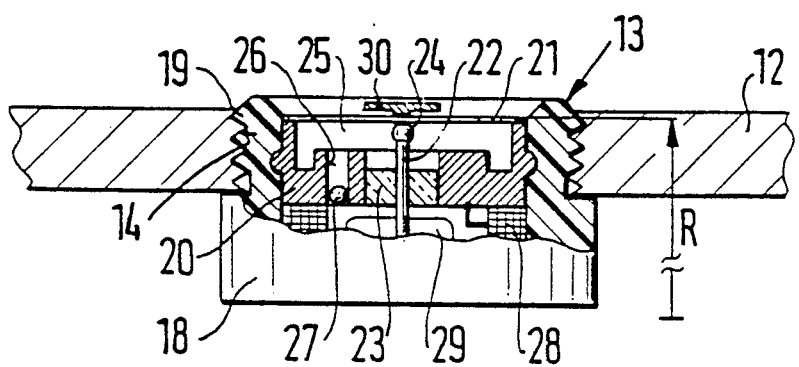
FIG. 2 shows a cross section through the tire pressure sensor, according to the invention, in enlarged view.

The construction of the tire pressure sensor 13 is shown in FIG. 2. It comprises a sensor housing 18 of insulating material which is screwed into the threaded bore hole 14 of the wheel rim 12 by a threaded projection 19. The sensor housing 18 is open in the front toward the tire 11. A reference pressure chamber 20 consisting of steel is inserted in the sensor housing 18 in a positive-locking manner and is closed toward the tire by means of an electrically conducting diaphragm 21 of high-grade steel. A contact pin 22 is fastened in the center of the reference pressure chamber 20 with a glass bushing 23 so as to seal it against pressure loss and electrically insulated in the base of the reference pressure chamber 20. The contact pin 22 carries a welded on contact ball 24, preferably consisting of gold, at its front end. The diaphragm 21 is welded at its outer circumference to the reference pressure chamber 20 by a laser beam so as to be seal the chamber tightly against pressure loss. The welded diaphragm is however free of tension. The pressure space 25 formed by the reference pressure chamber 20 is filled with air or nitrogen at the required reference pressure via the filling duct 26, so that the diaphragm 21 first contacts the contact ball 24 when the air pressure acting on the diaphragm 21 from the outside reaches the minimum pressure to be monitored in the tire of the vehicle, i.e. the so-called threshold value. After the reference pressure chamber 20 is filled, the filling duct 26 is sealed against pressure loss by a ball 27 which is pressed in or welded into it. A toroidal coil 28 and a capacitor 29 which are connected in series and form a resonant circuit which is opened and closed via the diaphragm 21 and the contact pin 22 are arranged in the sensor housing 18 below the reference pressure chamber 20. For this purpose, the free end of the toroidal coil 28 is connected with the diaphragm 21 via the reference pressure chamber 20 and the free end of the capacitor 29 is connected with the lower end of the contact pin 22, not shown.

An added mass 30 is freely arranged at the outside of the diaphragm 21 located parallel to the running surface of the tubeless tire in the assembled state, in that this added mass 30 is fastened at the center of the diaphragm by spot welding. FIG. 3a and FIG. 3b show two alternative solutions for the fastening of the added mass 30 at the diaphragm 21. According to FIG. 3a, the added mass 30, as round flat disk, is provided with a centric projection 31 at the underside of the diaphragm. This projection 31 is arranged on the center of the diaphragm and is fastened at the latter by a spot weld 32. According to FIG. 3b, a projection 31a has been produced at the diaphragm center, e.g. by of a relief etching of the diaphragm 21a, the added mass 30a, which is shaped as a flat round disk, being arranged on the projection 31a in the center and connected with the diaphragm by means of resistance welding. Both alternative solutions have the advantage that practically no stiffening of the diaphragm 21, 21a occurs because of the almost punctiform fastening of the added mass 30, 30a at the diaphragm center and the deflection of the diaphragm is maintained in its entirety as a function of the pressure differential at the diaphragm. Accordingly, it is possible to accurately calculate the magnitude of the added mass 30, 31 at a predetermined desired raising of the threshold value or switching threshold, since this added mass 30, 31 is freely subjected to the centrifugal forces and is not covered by the inner tube of the tire as was previously the case.

In FIG. 4, the characteristic line a shows the curve of the increase in the threshold value in a tire pressure sensor 13 with the added mass 30 as the driving speed increases. The threshold value of the tire pressure sensor 13 is increased by 0.5 bar from 2 bar to 2.5 bar relative to the value po at standstill at a vehicle speed of 260 km/h. Without the added mass, the threshold value according to the characteristic line b would be increased only insignificantly to approximately 2.1 bar by means of the mass of the diaphragm. The characteristic line c shows the tire pressure at which the tire is already destroyed under full load. This characteristic line likewise rises progressively with the speed and intersects the characteristic line b already before reaching the maximum speed of 260 km/h. Consequently, without an added mass, the tire would be destroyed without a warning from the tire pressure control device at a pressure of approximately 2.1 bar at high speeds. The threshold value of the characteristic line b is increased to the characteristic line a by the added mass 30, so that the characteristic line c is no longer intersected. As a result, an existing tire pressure of e.g. 2.1 bar is now sufficient only up to a speed of 130 km/h. At higher speeds, the threshold value of the tire pressure sensor 10 according to the characteristic line a is raised above the existing tire pressure by the added mass 30, the diaphragm 21 lifts off the contact 24 of the sensor 13 and an alarm signal is given which warns the driver to reduce the vehicle speed or increase the tire pressure.

In order to obtain a sufficient safe distance of characteristic line a from characteristic line c for the speed at which the tire is destroyed at full load, the reference pressure in the reference pressure chamber 20 of the tire pressure sensor 10 can be adjusted during manufacture to the tire pressure predetermined by the tire and vehicle manufacturers for full load in the lower speed range. The threshold value should be increased by at least 5% relative to the threshold value at standstill e.g. at a driving speed of 130 km/h.

The calculation of the added mass 30 at the tire pressure sensor 10 can be carried out in the following manner:

The following equation applies for the maximum deflection w1 of the center of a low-mass diaphragm by an added mass m at a rotational speed v of the diaphragm and the mass, respectively, at a rotational radius R of the diaphragm and the mass, respectively, at a diaphragm radius r and a stiffening factor K of the diaphragm:

$$w1 = m \cdot \frac{v^2}{R} \cdot \frac{r^2}{16 \cdot \pi \cdot K} \quad (1)$$

The following applies for the stiffening factor k of the diaphragm:

$$k = \frac{E \cdot a^3}{12(1 - v)} \quad (2)$$

This factor k is accordingly dependent on the modulus of elasticity E, the diaphragm thickness a and the transverse extension $v$ which has the value of $\sim 0.3$ for steel.

The maximum deflection w1 must be compensated for by an opposite deflection w2 of the diaphragm which is produced by the pressure increase $\Delta p$ in the tire and acts counter to the centrifugal forces at the added mass m. The following equation applies for the latter:

$$w2 = \frac{\Delta p \cdot r^4}{64 \cdot K} \quad (3)$$

The equation $$m1 = \frac{\pi}{4} \cdot \frac{R \cdot r^2}{v^2} \cdot \Delta p \quad (4)$$

follows from the condition w1−w2=0 for the added mass m1.

In the example, an added mass 30 of $$m1 = 0.37 \text{ g}$$

results at a rotational radius R=210 mm, a diaphragm radius r=10.5 mm and a rotational speed v=49 m/s (at a driving speed of 260 km/h and a rolling radius of the tire of 0.31 m) and at the desired raising of the threshold value of $\Delta p = 0.5$ bar.

The mass of the diaphragm and the raising of the threshold value according to characteristic line b from FIG. 4 which is caused by this is neglected in this calculation of the added mass 30. Depending on the material and thickness of the diaphragm, however, the influence of the diaphragm mass is significant. Thus, the equation $$w3 = \rho \cdot a \cdot \frac{v^2}{R} \cdot \frac{r^4}{64 K} \quad (5)$$

results for the deflection w3 of the diaphragm center without the added mass at a specific weight $\mu$ and a diaphragm thickness a.

Since this deflection w3 acts in the same direction as the added mass 30 because of the diaphragm mass, it must also be compensated for by means of raising the threshold value $\Delta p$. The equation $$m = \frac{\pi}{4} \cdot r^2 \cdot \left( \frac{R}{v^2} \cdot \Delta p - \rho \cdot a \right) \cdot K \quad (6)$$

then follows from this condition w1+w3−w2=0 for the added mass 30.

In this case, the factor k is a constant which primarily accounts for a stiffening of the diaphragm because of the nonpunctiform fastening of the added mass 30 and the irregular diaphragm thickness a and the inexact fixed clamping of the diaphragm 21 at the outer rim of the reference pressure chamber 20. The value is between 1.1 and 1.5 depending on the construction of the tire pressure sensor. In the example, the thickness of the diaphragm a is 0.2 mm, the density $\mu$ is 7.9 g/mm³ and the factor k is 1.4. According to formula (6), this results in m=0.34 g for the added mass 30.

The limiting values for the tire pressure currently prescribed by tire and vehicle manufactures in the example are plotted in FIG. 4 as characteristic line VL for full load and as characteristic line TL for partial load. Since these tire pressures are higher at full load than at partial load, it is suggested in the tire pressure sensor with the added mass 30, according to the invention, that at a sufficient distance of at least 0.3 bar from the characteristic line c of the speed at which the tire is destroyed the threshold value according to characteristic line a' in the stationary state of the vehicle be lowered to the partial load value or even below the latter in that the pressure of the reference pressure chamber 20 be correspondingly lowered during manufacture and that the threshold value be increased above the currently prescribed tire pressure limiting value at full load by means of the added mass 30 at high speeds. Accordingly, a greater suspension comfort is achieved in the lower speed range compared to the adjustment of the reference pressure to the predetermined full load value, and greater safety is achieved in the upper speed range compared to a monitoring device with the known tire pressure sensors.

It will be understood that each of the elements described above, or two or more together, may also find a useful application in other types of structures differing from the type described above.

While the invention has been illustrated and described as embodied in a tire pressure sensor for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A tire pressure sensor for a vehicle, said vehicle having a plurality of vehicle wheels, each of said vehicle wheels having a wheel axis and a wheel rim on which a tire is mounted, said tire having a tire pressure and a running surface said tire pressure sensor comprising a pressure switch which is mounted on the circumference of the wheel rim of one of the vehicle wheels and which extends radially relative to the wheel axis, said pressure switch being actuable by the tire pressure and being provided with an electrically conductive diaphragm responding to and communicating with the tire pressure in the tire, said electrically conductive diaphragm being arranged parallel to the running surface of the tire, said diaphragm being provided with an added mass for increasing a switching threshold of the tire pressure sensor as a function of speed of the vehicle, said diaphragm having a contact, which is contacted by a contact surface, on a central area of the diaphragm for closing an electric circuit, when the tire pressure in the tire is large enough, wherein the state of the electric circuit is to be monitored without the use of wires by a signal generator, which is mounted in the vehicle and said signal generator includes an evaluating circuit; furthermore the added mass (30, 30a) is fastened at the diaphragm center, is free so as not to impede the motion of the diaphragm and is determined by a functional relationship between the variables $\Delta p$, $r^2$, R and $v^2$ so as to be large enough to increase the switching threshold by a desired pressure differential $\Delta p$ compared with the threshold value $p_o$ at a stationary state, at a predetermined radius r of the diaphragm, at a predetermined rotational radius R of the diaphragm, and at a predetermined rotational speed v of the diaphragm.

2. The sensor as defined in claim 1, wherein the added mass m (30, 30a) is determined by the equation (6)

$$m = n/4 \cdot r^2 (R/v^2 \cdot \Delta p - \cdot a) \cdot k$$

wherein $\rho$(rho) is the material density of the diaphragm (21), a is the diaphragm thickness and k is a constant which accounts for a stiffening of the diaphragm and is between 1.1 and 1.5.

3. The improvement as defined in claim 1, further comprising a centric projection (31, 31a) provided on the diaphragm (21), said added mass (30, 30a) being attached to the centric projection.

4. The improvement as defined in claim 1, wherein the increase of the switching threshold at a driving speed of 130 km/h amounts to at least 5% compared to a threshold value $p_o$ in the stationary state.

5. The improvement as defined in claim 1, wherein the added mass is fastened to the diaphragm (21) with a spot weld (32).

6. The improvement as defined in claim 3, wherein the added mass is fastened to the diaphragm (21) with a spot weld (32).

* * * * *